(12) United States Patent
Tremmel et al.

(10) Patent No.: US 7,296,849 B2
(45) Date of Patent: Nov. 20, 2007

(54) COVERING DEVICE FOR COVERING MOUNTING RECESSES IN THE COVER STRIPS OF A VEHICLE ROOF

(75) Inventors: Günter Tremmel, Schwörstadt (DE); Jürgen Vollmer, Buggingen (DE)

(73) Assignee: A. Raymond & Cie, Grenoble (FR)

( * ) Notice: Subject to any disclaimer, the term of this patent is extended or adjusted under 35 U.S.C. 154(b) by 230 days.

(21) Appl. No.: 10/536,666

(22) PCT Filed: Nov. 13, 2003

(86) PCT No.: PCT/EP03/12670

§ 371 (c)(1),
(2), (4) Date: May 27, 2005

(87) PCT Pub. No.: WO2004/050430

PCT Pub. Date: Jun. 17, 2004

(65) Prior Publication Data

US 2006/0012221 A1    Jan. 19, 2006

(30) Foreign Application Priority Data

Nov. 30, 2002   (DE) ............................. 102 56 052

(51) Int. Cl.
*B60R 13/00* (2006.01)
*B60R 13/04* (2006.01)

(52) U.S. Cl. ........................................ 296/210
(58) Field of Classification Search ............. 296/210, 296/37.7, 1.07
See application file for complete search history.

(56) References Cited

U.S. PATENT DOCUMENTS 6,557,931 B1 * 5/2003 Tremmel et al. ............ 296/213

FOREIGN PATENT DOCUMENTS

| DE | 198 40 294 A1 | 3/2000 |
| DE | 10356382 A1 * | 7/2005 |
| FR | 2 833 907 A | 6/2003 |
| FR | 2868026 A1 * | 9/2005 |
| GB | 2367046 A * | 3/2002 |

OTHER PUBLICATIONS

International Search Report dated Feb. 11, 2004 for PCT International Application No. PCT/EP03/12670 filed Nov. 13, 2003 (3 pages).

* cited by examiner

*Primary Examiner*—H Gutman
(74) *Attorney, Agent, or Firm*—Dickinson Wright PLLC

(57) ABSTRACT

The invention relates to a covering device for covering a mounting recess in a cover strip of a vehicle roof. Mounting recesses of this type are, for example, provided for fastening the feet of a roof luggage carrier. The covering device is comprised of an insertion part (1), which can be positioned inside the cover strip (3), and of a hinged cover (2), which is mounted in bearing shells (7) in a manner that enables it to pivot about an axis in the longitudinal direction of the strip and which fills the recess (4) when in a closed position. Said hinged cover comprises both bearing journals (6), which are shaped thereon at both ends, as well as detent journals (11), which can be locked in an open and closed position by means of spring elements (12). These spring elements are shaped onto the insertion part (1) and act upon the detent journals (11). The hinged cover (2), when in an open position, enables an unhindered access to the recess (4) by virtue of the fact that the bearing journals (6) and detent journals (11) are shaped onto the hinged cover (2) via a U-shaped element (5), which is dimensioned in such a manner that the edge (8) of the recess (4) projects into the open space (9) of the element (5) when the hinged cover (2) is open.

17 Claims, 3 Drawing Sheets

COVERING DEVICE FOR COVERING MOUNTING RECESSES IN THE COVER STRIPS OF A VEHICLE ROOF

CROSS-REFERENCE TO RELATED APPLICATIONS

This application is a National Stage of International Application No. PCT/EP03/12670, filed on Nov. 13, 2003, which claims priority to German Patent Application No. 102 56 052.8, filed on Nov. 30, 2002. The disclosures of the above applications are incorporated herein by reference.

BACKGROUND OF THE INVENTION

The invention refers to a covering device for covering mounting recesses in the cover strips of a vehicle roof.

These mounting recesses are provided with cover strips at the locations where, for example, anchoring points for possible fastening of the support feet of roof luggage carriers are found in the roof channel beneath. As long as the locations are not being utilized and there is no need for the channels to be open, the recesses are, as a rule, closed by a corresponding cover, not only for the protection of the fastening site but also for visual reasons.

A generic covering device is known from DE 198 40 294 C2, in which the hinged cover filling the recess in the closed position has bearing journals, projecting in the strip longitudinal direction, which are shaped as a straight extension of the pivoting cover edge. This results in the bearing shells below the recess being located close to the edge of the recess, and the cover, when pivoted up, of necessity narrows the recess corresponding to its cover thickness.

The goal of the invention is to design the generic covering device so that the hinged cover does not hinder access to the recess when open.

SUMMARY OF THE INVENTION

This goal is attained according to the invention in that the bearing journals are shaped on the hinged cover via a U-shaped element, which is dimensioned such that the edge of the recess, when the hinged cover is in the open position, projects into the open space of the U-shaped element.

By means of this arrangement of the journal rotation point in the insertion part and the U-shaped formation of the hinged element, the roof strip recess can be almost completely opened. The roof hinge is then tilted back far enough from the recess, in the open position, that the feet of the roof luggage carrier can be easily guided to the fastening sites and be fastened there.

BRIEF DESCRIPTION OF THE DRAWINGS

Advantageous configurations of the invention are indicated in the subclaims and can be seen from the drawings, which show a preferred embodiment of the invention and which are described in more detail below. The figures show the following:

DETAILED DESCRIPTION OF THE PREFERRED EMBODIMENT

Figure 1:
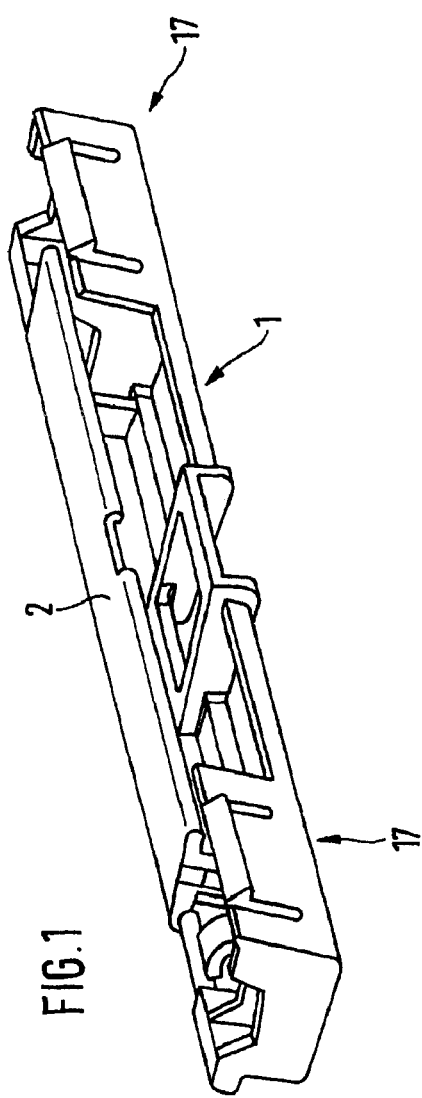
FIG. 1, the cover device according to the invention, with pivoted-down hinged cover, in an oblique view.
Figure 2:
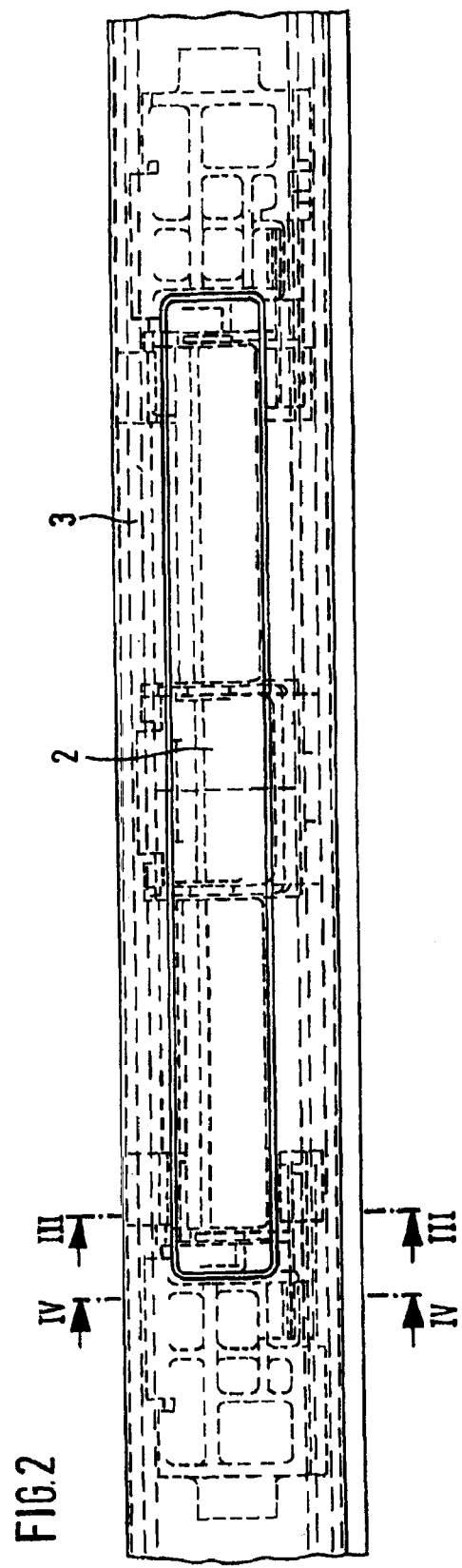
FIG. 2, a section of the cover strip of a vehicle roof with a covered recess, in a top view.

The covering device shown in the figures is used to close a mounting recess 4 in a cover strip 3 of a vehicle roof, as long as the fastening site for a roof luggage carrier, or other mechanism, found under the recess 4 is not needed.

This covering device consists of an insertion part 1, which can be positioned in the cover strip 3, and a hinged cover 2, which is supported so that it can pivot around an axis in the longitudinal direction of the cover strip 3 and covers the recess 4 in the closed position. The hinged cover 2 is connected to the insertion part 1 via a U-shaped element 5 with bearing journals 6 at each end. The bearing journals 6 are supported so they can pivot in bearing shells 7 shaped on the insertion part 1 when the hinged cover 2 is connected thereto. The U-shaped element 5 is shaped such that the edge 8 of the recess, when the hinged cover 2 is in the open position, projects into the open space 9 of the U-shaped element 5.

The bearing shells 7 embrace the bearing journals 6 over slightly more than half of their circumference. The bearing shells 7 elastically flex while the bearing journals 6 are being inserted and, after the bearing journals 6 have been completely inserted in the bearing shells 7, spring together again and thereby embrace the bearing journals 6 in a clamping manner. On the sides facing one another, the bearing shells 7 are provided with lateral stop walls 10 by means of which the bearing journals 6 are positioned, after insertion at opposing ends in the longitudinal direction of the bearing shells 7.

The bearing journals 6 have the so-called catch pin 11 on the ends directed away from one another. These catch pins 11 work together with the spring elements 12 shaped on the insertion part 1 in the open and closed positions of the hinged cover 2 so that this cover 2 is held securely in both end positions. In the present embodiment, these spring elements 12 are shaped like spring ribs 13 which are formed at one end on the insertion part 1. The other, elastically springy end, is guided in an arc pointing toward the catch pin 11, and shaped on its front side 14 with a catch edge 15 that catches in correspondingly shaped catch grooves 16 in the catch pin 11 in the aforementioned end positions of the hinged cover 2.

The insertion part 1, holding the hinged cover 2, consists of an elongated basic body made of hard elastic plastic, which is built in the following manner:

On both ends, there are bearing bodies 17 with two side walls 18 and 19 and a bottom plate 20 and a front wall 21. These bearing bodies 17 are connected laterally with one another by ribs 22, shaped on the bottom plate 20, which are fixed with respect to one another by transverse ribs 23 in the middle.

Figure 3:
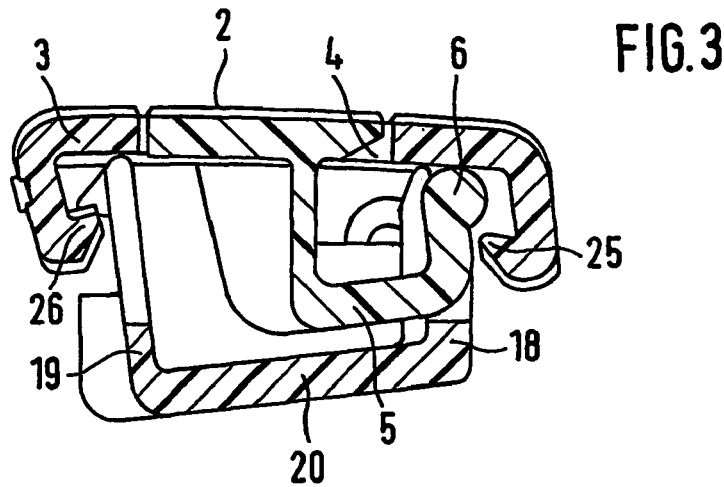
FIG. 3, a cross section through the cover strip, with inserted covering device with a closed hinged cover, according to line III-III in FIG. 2.
Figure 4:
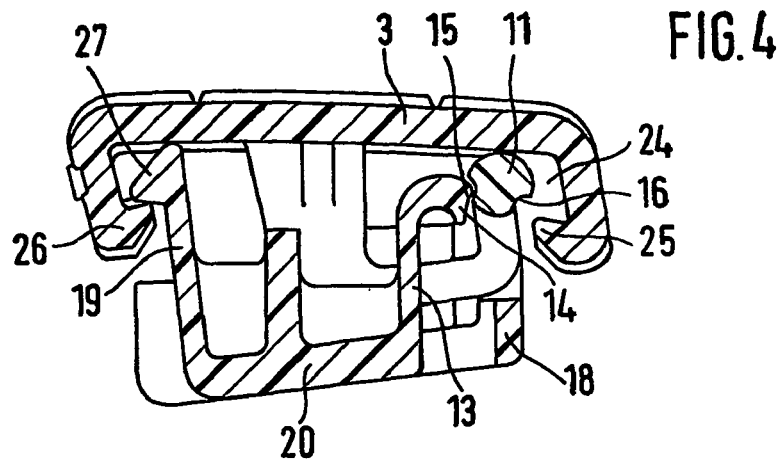
FIG. 4, the same cross section through the cover strip according to line IV-IV in FIG. 2.
Figure 5:
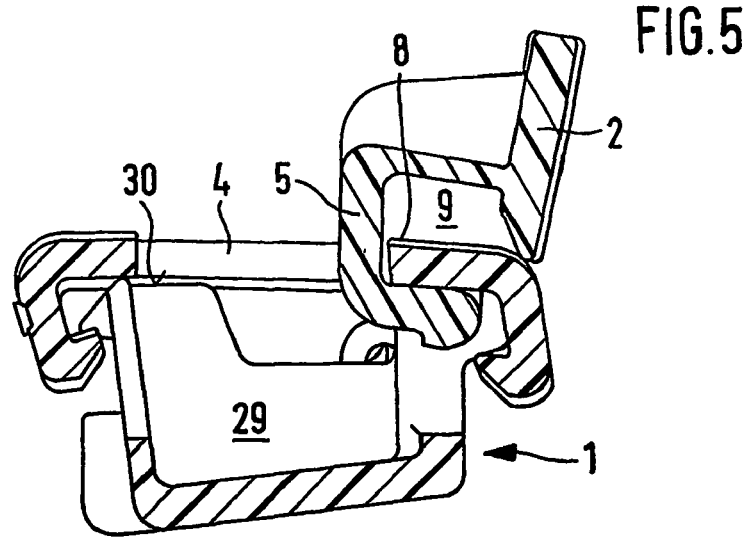
FIG. 5, the same cross section as in FIG. 3, with an open hinged cover.
Figure 6:
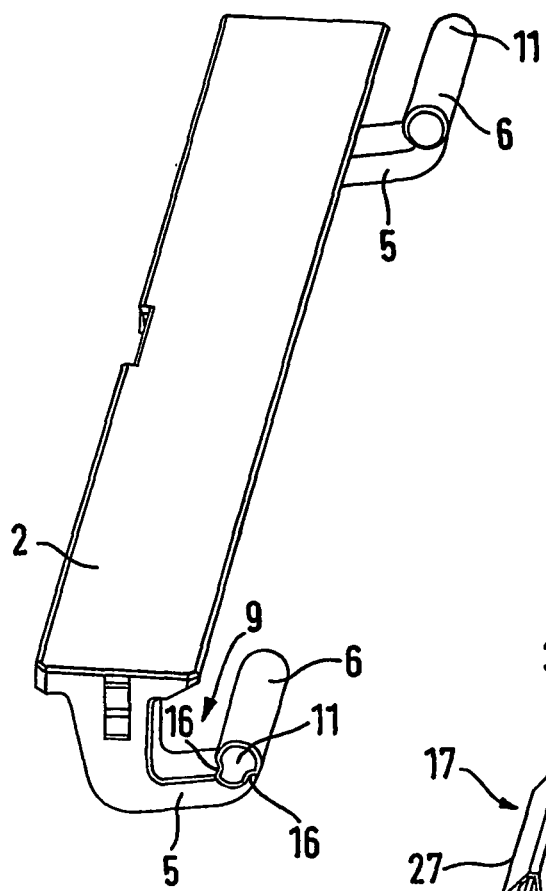
FIG. 6, the hinged cover in an oblique top view.
Figure 7:
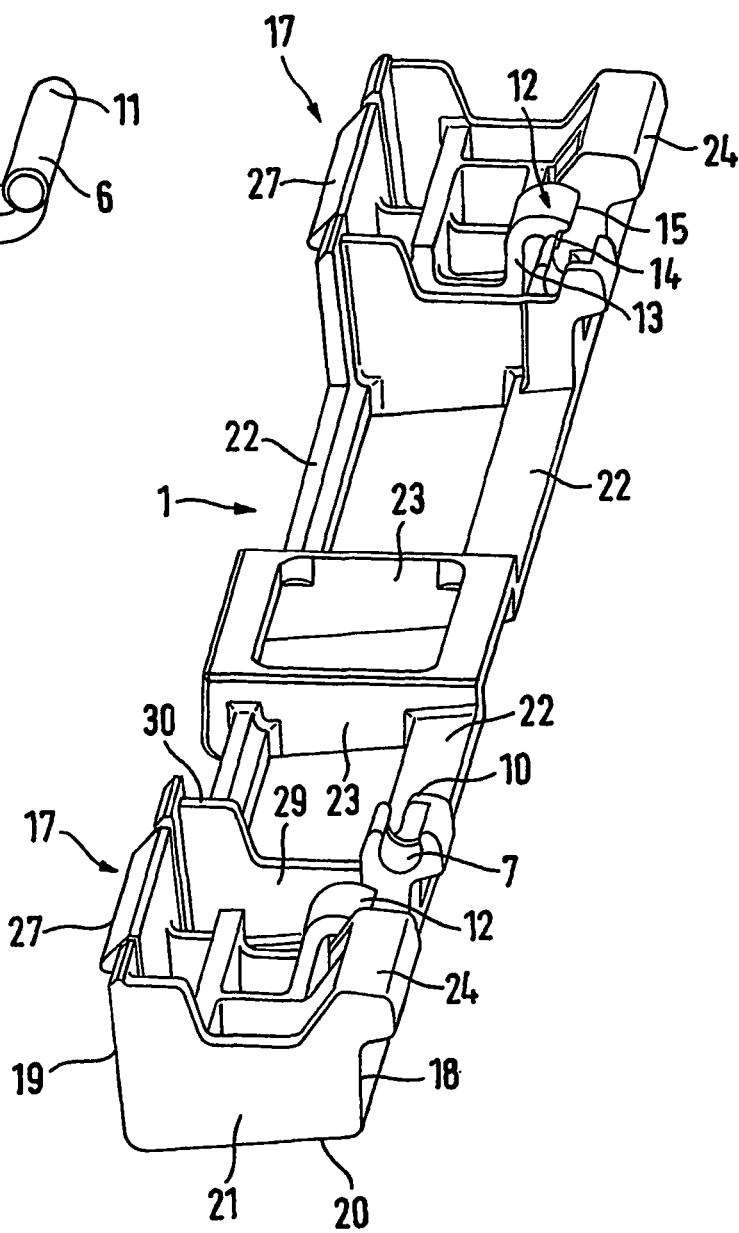
FIG. 7, the corresponding insertion part in oblique top view.

The bearing bodies 17 are shaped in cross section such that they have a place in the roof channel below the cover strip, and can be elastically connected to the strip edges 25 and 26 of the roof channels, which have been flanged all around toward the inside (shown in FIGS. 3-5). For this purpose, hooks 24, which project to the outside, are shaped on the upper edge of a side wall 18, for engaging in the strip edge 25, and on the upper edge of the side wall 19, lying opposite, catch hooks 27 are also shaped in a region slit on both sides, these springing inwards while being inserted into cover strip 3, and then again catching above the strip edge 26. The other areas of the side wall 19 are dimensioned such that during the latching of the hooks 27 they bear against the cover strip 3 from below.

The two bearing shells 7 are found on the upper edge of the side wall 18 on the sides of the bearing bodies 1 facing one another, whereas the spring ribs 13 on the bearing body 17 are shaped such that the front sides 14 with the catch edges 15, bent outwards, are directed toward the catch pins 11. The distance between the bearing shell 7 and the spring rib 13 is dimensioned such that the U-shaped element 5 can pivot in between. The inside transverse wall 29 between the side walls 18 and 19 has a support edge 30 for support of the hinged cover 2 in the closed position.

Mounting of the covering device is easy. The insertion part 1 is introduced, from below, with its catching hooks 24, behind the strip edge 25 of the cover strip 3, at an incline, and then pressed upwards with the catch hooks 27 until they latch in the opposite strip edge 26. One has merely to ensure that the hinged cover 2, previously pressed into the bearing shells 7, is oriented centrally in the mounting recess 4 of the cover strip 3.

The invention claimed is:

1. A covering device for a mounting recess in a cover strip of a vehicle roof, comprising an insertion part (1), which can be positioned in the cover strip (3), and a hinged cover (2), comprising bearing journals (6), shaped on both ends, said hinged cover being supported so it can pivot about an axis in a strip longitudinal direction, said hinged cover covering the recess (4) in a closed position, with the bearing journals supported in bearing shells (7) shaped on the insertion part (1), said bearing journals comprising catch pins (11) which can lock in an open position and the closed position by means of spring elements (12) which are shaped on the insertion part (1) and act on the catch pins (11), characterized in that the bearing journals (6) are shaped on the hinged cover (2) via a U-shaped element (5), said U-shaped element (5) being dimensioned such that an edge (8) of the recess (4) projects into an open space (9) of the element (5) in the open position, the bearing journals (6) face one another and are supported in a clamping manner in the bearing shells (7), and the catch pins (11) are arranged in an opposed direction, wherein said catch pins (11) work together with the spring elements (12).

2. The covering device according to claim 1, characterized in that the bearing journals (6) further comprise grooves (16), into which correspondingly shaped catch edges (15) on the spring elements (12) catch in the open and closed positions of the hinged cover (2).

3. The covering device according to claim 2, characterized in that the spring elements (12) are shaped as arc-shaped spring ribs (13) and are formed at one end on the insertion part (1) and, at a second end point toward the catch pins (11), wherein the catch edges (15) are formed on a front side (14) of the second end.

4. A covering device for a mounting recess in a cover strip of a vehicle roof, comprising an insertion part (1), which can be positioned in the cover strip (3), and a hinged cover (2), comprising bearing journals (6), shaped on both ends, said hinged cover being supported so it can pivot about an axis in a strip longitudinal direction, said hinged cover covering the recess (4) in a closed position, with the bearing journals supported in bearing shells (7) shaved on the insertion part (1), said bearing journals comprising catch pins (11) which can lock in an open position and the closed position by means of spring elements (12) which are shaped on the insertion part (1) and act on the catch pins (11), characterized in that the bearing journals (6) are shaped on the hinged cover (2) via a U-shaped element (5), said U-shaped element (5) being dimensioned such that an edge (8) of the recess (4) projects into an open space (9) of the element (5) in the open position, and the bearing shells (7) comprise lateral stop walls (10), said lateral stop walls restrainedly positioning the bearing journals (6) in the strip longitudinal direction.

5. The covering device according to claim 4, characterized in that the bearing journals (6) further comprise grooves (16), into which correspondingly shaped catch edges (15) on the spring elements (12) catch in the open and closed positions of the hinged cover (2).

6. The covering device according to claim 5, characterized in that the spring elements (12) are shaped as arc-shaped spring ribs (13) and are formed at one end on the insertion part (1) and, at a second end point toward the catch pins (11), wherein the catch edges (15) are formed on a front side (14) of the second end.

7. A covering device for a mounting recess in a cover strip comprising:
   an insertion part, said insertion part being capable of coupling with said cover strip, and
   a hinged cover, said hinged cover being hinged with said insertion part by means of at least one bearing journal on said hinged cover coupling with at least one bearing shell on said insertion part, wherein:
   said hinged cover is capable of pivoting about an axis in a strip longitudinal direction,
   said hinged cover is capable of covering said mounting recess in a closed position,
   said at least one bearing journal comprises at least one catch face, said at least one catch face being capable of interacting with a spring element so as to lock said hinged cover in an open position and said closed position, and
   an opening is defined between said hinged cover and said at least one bearing journal, said opening being capable of receiving an edge of said insertion part in said open position, wherein said at least one bearing journal further comprises at least one lateral stop wall, said lateral stop wall being capable of positioning said at least one bearing journal within said at least one bearing shell.

8. The covering device of claim 7, wherein said hinged cover is capable of pivoting more than 90° about said axis.

9. The covering device of claim 7, wherein said spring element is formed on said insertion part.

10. The covering device of claim 9, wherein said insertion part further comprises at least one support rib, said support rib being capable of supporting said hinged cover in said closed position.

11. The covering device of claim 7, wherein said insertion part further comprises at least one support rib, said support rib being capable of supporting said hinged cover in said closed position.

12. The covering device of claim 7, wherein said insertion part further comprises at least one hook, said at least one hook being capable of restraining said insertion part within said cover strip.

13. The covering device of claim 12, wherein said hinged cover is capable of pivoting more than 90° about said axis.

14. The covering device of claim 7, wherein said at least one catch face comprises a pair of catch faces, a first of said pair of catch faces being capable of interacting with said spring element so as to lock said hinged cover in said open position, and a second of said pair of catch faces being capable of interacting with said spring element so as to lock said hinged cover in said closed position.

15. The covering device of claim 14, wherein said spring element is formed on said insertion part.

16. The covering device of claim 14, wherein said insertion part further comprises at least one support rib, said support rib being capable of supporting said hinged cover in said closed position.

17. The covering device of claim 14, wherein said insertion part further comprises at least one hook, said at least one hook being capable of restraining said insertion part within said cover strip.

* * * * *